May 31, 1966 S. F. WATANABE 3,253,785
ROCKET NOZZLE CONSTRUCTION
Filed Sept. 12, 1962
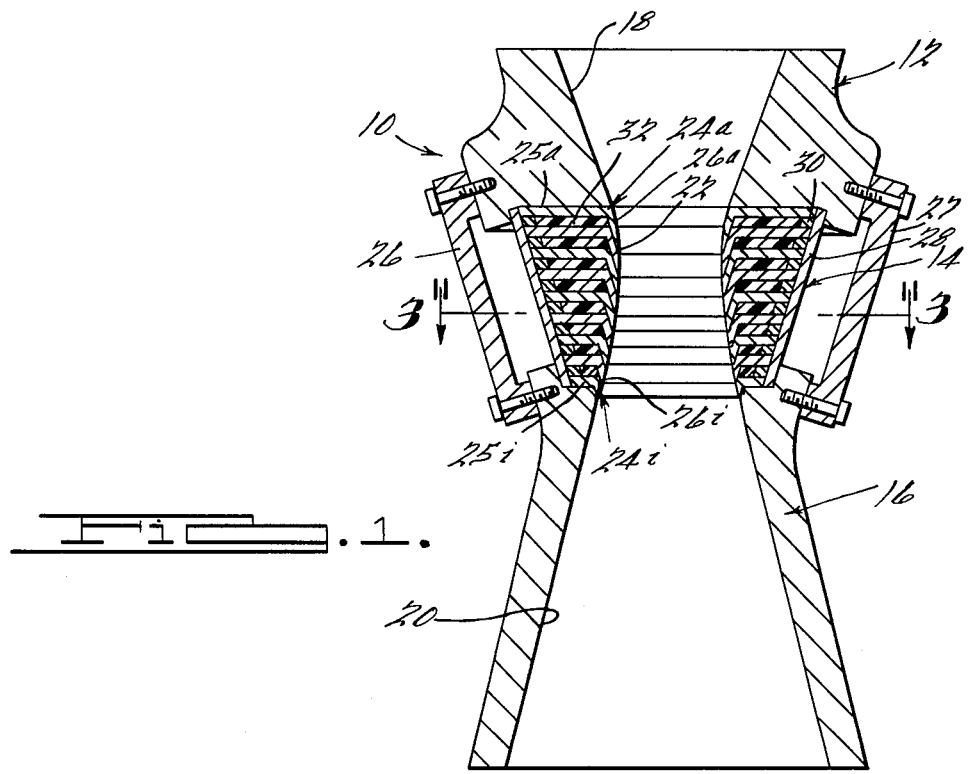
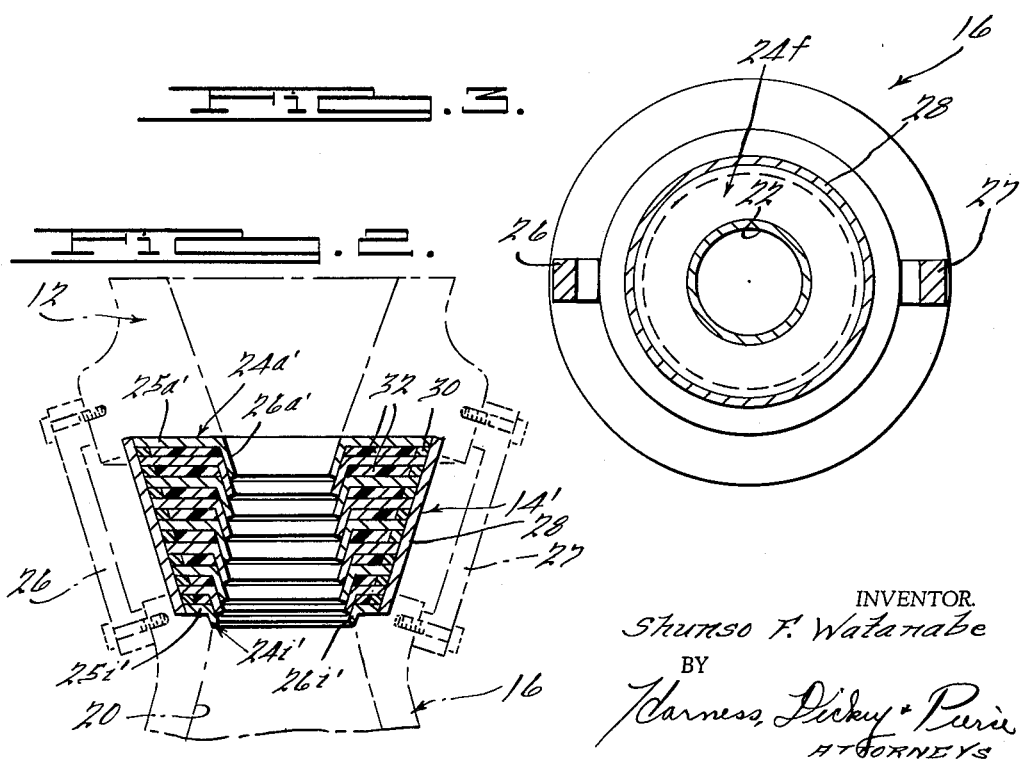
INVENTOR.
*Shunso F. Watanabe*
BY
*Harness, Dickey & Pierce*
ATTORNEYS

3,253,785
ROCKET NOZZLE CONSTRUCTION
Shunso F. Watanabe, Livonia, Mich., assignor to Kelsey-Hayes Company, Romulus, Mich., a corporation of Delaware
Filed Sept. 12, 1962, Ser. No. 223,108
5 Claims. (Cl. 239—265.15)

This invention relates to nozzles for directing fluid flow and more particularly to exhaust nozzles for use on propulsively driven rockets, missiles, or the like.

In exhaust or discharge nozzles utilized in the propulsion of jet aircraft, rockets or missiles, the temperatures attained at the throat of the nozzle can be extremely high, i.e., 6000° F., often resulting in damage to the nozzle in that area. It is an object of this invention to provide a novel exhaust nozzle for use in the propulsion of jet aircraft, rockets or missiles having means for lowering the temperature at the throat of the nozzle.

It is another object of this invention to provide a novel exhaust nozzle assembly for use in the propulsion of jet aircraft, rockets or missiles in which the throat of the nozzle assembly is partially shielded from the hot burning gases passing therethrough.

Other objects, features, and advantages of the present invention will become apparent from the subsequent description and the appended claims, taken in conjunction with the accompanying drawings, in which:

FIGURE 1 is a side elevational, sectional view of a novel exhaust nozzle assembly embodying the features of this invention;

FIGURE 2 is a fragmentary, sectional view depicting the throat section of the nozzle assembly of FIGURE 1 prior to final machining of the throat contour, with the remaining parts of the nozzle assembly being partially shown in phantom; and FIGURE 3 is a sectional view of the exhaust nozzle assembly of FIGURE 1 taken substantially along the lines 3—3 in FIGURE 1.

Looking now to the drawing, an exhaust or discharge nozzle assembly embodying the features of this invention is generally indicated by the numeral 10 and is composed of an input section 12, a throat section 14 and an outlet section 16 connected axially together in that order. The exhaust section 12 has a generally frusto conically shaped, radially inwardly tapering, axially outwardly extending inner surface or inlet passageway 18, while the outlet portion 16 has a generally frusto conically shaped, axially outwardly extending and radially outwardly flaring inner surface or outlet passageway 20. The inner inlet surface 18 and the inner outlet surface 20 are smoothly communicated together by a generally arcuately shaped inner surface or throat passageway 22 of a reduced cross section in the throat section 14. The throat section 14 can be secured in matable abutment between the inlet section 12 and the outlet section 16 by means of a pair of braces or arms 26 and 27 threadably secured to both the inlet section 12 and the outlet section 16 to thereby form the integral exhaust nozzle assembly 10. Thus the passageways 18, 22 and 20 provide a path for the discharge of the hot burning gases.

As previously noted, the temperatures at the surface of the throat passageway 22 can become extremely high, i.e., 6000° F. resulting in the destruction of or damage to the throat portion 14. To prevent this from occurring, the throat section 14 is constructed of a plurality of axially spaced laminations which form a plurality of annular cavities. The cavities are filled with a vapor forming material which absorbs heat incident at the throat passageway 22 during vaporization, thus cooling the surface of the throat passageway 22. The vapor is free to flow from between the laminations and over the surface of the throat passageway 22 to thereby partially shield the throat passageway 22 from the hot gases and effectuate a further temperature reduction.

More specifically now, and looking to FIGURE 2, the throat section 14' (similar to throat section 14 of FIGURE 1 but prior to machining of the throat passageway 22) can be constructed of a plurality of generally circularly shaped tungsten disks 24a'–24i', each having a generally flat, radially extending portion 25a'–25i', respectively, terminating at its radially inner extremity in an axially outwardly extending lip portion 26a'–26i', respectively. Each lip 26a'–26i', while extending axially, tapers slightly radially inwardly for a purpose to be readily seen. The successive disks 26a'–26i' are generally formed with the minimum diameter of each lip 26a'–26i' greater than that of the previous lip. This causes the throat passageway to flare radially outwardly in the axially outward direction. The minimum diameters of successive ones of the lip portions 26a'–26i' could be varied, however, to provide any selected contour. As can be seen in FIGURE 2, the partially overlapping lip portions 26a'–26i' provide an irregular surface on the inside of the throat passageway. This surface can be machined to form disks 24a–24i having lip portions 26a–26i defining a smoothly contoured surface 22 as shown in FIGURE 1.

The disks 24a–24i are axially retained within an annular, frusto conically shaped outer sleeve 28 with adjacent disks 24a–24i being maintained in spaced relationship from each other by one of a plurality of spacers 30 disposed at the radially outer edge of the flat portions 25a–25i. The voids or cavities between adjacent ones of disks 24a–24i are filled with a suitable heat sink material 32 which absorbs heat while vaporizing. The heat sink material vaporizes at a preselected temperature below the maximum temperatures attainable in the throat passageway 22 and thus cools the surface of the throat passageway in a manner to be seen. The heat sink material 32 can be powdered lithium fluoride formed in the appropriate shape by means of a paraffin binder to fit the cavities; similarly, heat sink disks could be constructed of other suitable materials such as powdered Teflon (polytetrafluoroethylene) bonded together by a suitable bonding agent such as phenolic resin or powdered beryllium fluoride formed into the appropriate shape.

As assembled, the overlapping lip portions 26a–26i do not seal the cavities in which the heat sink material 32 is disposed. To insure that these cavities are annularly opened, the disks 24a–24i could be spaced such that a slight annular gap exists between adjacent ones of the lip portions 26a–26i. Thus, as hot exhaust gases pass through the throat passageway 22, the temperature of the heat sink material 32 increases. As the temperature in the throat passageway 22 approaches its maximum, the heat sink material 32 begins to vaporize with the resultant vapor pressure causing the vapor to escape between the interfaces of the overlapping lip portions 26a–26i. As the heat sink material 32 is vaporized, heat is absorbed, thereby holding the temperature of the lip portions 26a–26i and hence of the throat passageway 22 at a lower temperature. Also, the escaping vapor of the heat sink material acts as a shield as it passes over the surface of the throat passageway 22 to further protect that surface from the high temperatures of the hot exhaust gases being discharged. An increase in the temperature in the throat passageway 22 is usually accompanied by an increase in the velocity of the gases discharged therethrough, thereby causing more of the vaporized heat sink material 32 to flow into the throat passageway 22, increasing the cooling effect.

Thus it can be seen that with an exhaust assembly constructed in the manner described, excessive tempera- While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a discharge nozzle assembly for exhausting hot gases, the combination comprising an inlet section having an annularly shaped inlet passageway and an outlet section having an annularly shaped outlet passageway, a throat section disposed between said inlet and said outlet sections and having an annularly shaped throat passageway of reduced cross section communicating said passageways in said inlet and said outlet sections, said throat section having a plurality of disks each having a radially extending portion terminating at its radially inner extremity in an axially outwardly extending annular lip portion having a generally circular cross section and defining a central aperture, said disks being coaxially disposed relative to each other with each of said disks having said radially extending portion axially spaced from said radially extending portion of the adjacent one of said disks and with each said lip portion of each of said disks disposed in partial overlapping relationship proximate said lip portion of said adjacent one of said disks and with said lip portions defining the contour of said throat passageway, vapor forming means disposed in the cavities between adjacent ones of said disks for absorbing heat incident at said throat passageway during vaporization at a preselected temperature and for flowing from said cavities over the surface of said throat passageway for shielding said throat passageway from the hot gases passing therethrough.

2. The discharge nozzle assembly of claim 1 further including a plurality of spacers axially separating said plurality of disks and means clamping said disks and said spacers together.

3. In a discharge nozzle assembly for exhausting hot gases, the combination comprising an inlet section having an annularly shaped inlet passageway and an outlet section having an annularly shaped outlet passageway; a throat section disposed between said inlet and said outlet sections and having an annularly shaped throat passageway of reduced cross section communicating said passageways in said inlet and said outlet sections; said throat section having a plurality of generally flat disks each terminating at its radial inner extremity in an axially outwardly extending, radially inwardly tapering annular lip portion defining a central aperture, said disks axially spaced from each other with each said lip portion disposed in partial overlapping relationship proximate said lip portion of the adjacent one of said disks, said lip portions being of varying diameters relative to each other and being smoothly formed to define said throat passageway; vapor forming means disposed between adjacent disks for absorbing heat incident at said throat passageway during vaporization at a preselected temperature and for flowing into said throat passageway for shielding said lip portions from the hot gases being discharged.

4. In a discharge nozzle assembly for exhausting hot gases, the combination comprising an inlet section having an annularly shaped inlet passageway and an outlet section having an annularly shaped outlet passageway; a throat section disposed between said inlet and said outlet sections and having an annularly shaped throat passageway of reduced cross section communicating said passageways in said inlet and said outlet sections; said throat section having a plurality of generally flat disks located in an annular sleeve, each of said disks terminating at its radial inner extremity in an axially outwardly extending, radially inwardly tapering annular lip portion defining a central aperture, said disks axially spaced from each other with each said lip portion disposed in partial overlapping relationship proximate said lip portion of the adjacent one of said disks, said lip portions being of varying diameters relative to each other and being smoothly formed to define said throat passageway; vapor forming means disposed between adjacent disks for absorbing heat incident at said throat passageway during vaporization at a preselected temperature and for flowing into said throat passageway for shielding said lip portions from the hot gases being discharged, and means for securing said inlet section, said outlet section, and said throat section together.

5. In a discharge nozzle assembly for exhausting hot gases, the combination comprising an inlet section having an inlet passageway, an outlet section having an outlet passageway, a throat section disposed between said inlet and said outlet sections having a throat passageway of reduced cross section communicating said passageways in said inlet and said outlet sections, one of said sections having a plurality of axially spaced radially extending laminations defining at their radially inner ends the contour of the passageway through said one of said sections, each of said laminations terminating at their radially inner ends in an axialy outwardly extending, radially inwardly tapering, annular lip portion with each said lip portion disposed in partial overlapping relationship proximate said lip portion of the adjacent one of said laminations, and vapor forming means disposed between adjacent ones of said laminations for absorbing heat incident at the passageway of said one of said sections during vaporization at a preselected temperature.

References Cited by the Examiner

UNITED STATES PATENTS

| | | | |
|---|---|---|---|
| 2,695,495 | 11/1954 | Peterman | 60—35.6 |
| 3,014,353 | 12/1961 | Scully et al. | 60—35.6 |
| 3,022,190 | 2/1962 | Feldman | 60—35.6 |
| 3,026,806 | 3/1962 | Runton et al. | 60—35.6 |
| 3,048,972 | 8/1962 | Barlow | 60—35.6 |
| 3,070,957 | 1/1963 | McCorkle | 60—35.6 |
| 3,073,111 | 1/1963 | Hasbrouck | 60—35.6 |
| 3,089,318 | 5/1963 | Hebeler. | |
| 3,091,924 | 6/1963 | Wilder | 60—35.54 |
| 3,103,885 | 9/1963 | McLauchlan. | |
| 3,115,746 | 12/1963 | Hsia | 60—35.6 |
| 3,129,560 | 4/1964 | Prosen | 60—35.6 |
| 3,142,960 | 8/1964 | Bluck | 60—35.6 |

MARK NEWMAN, *Primary Examiner.*

SAMUEL LEVINE, C. R. CROYLE, *Examiners.*